United States Patent [19]

Müller et al.

[11] Patent Number: 4,719,669

[45] Date of Patent: * Jan. 19, 1988

[54] FASTENING MEMBER FOR A TIRE CHAIN

[75] Inventors: Anton Müller, Aalen-Unterkochen; Hubert König, Aalen; Ludwig Wolfbeis, Aalen-Hofherrnweiler, all of Fed. Rep. of Germany

[73] Assignee: Eisen- und Drahtwerk Erlau Aktiengesellschaft, Aalen, Fed. Rep. of Germany

[*] Notice: The portion of the term of this patent subsequent to Sep. 24, 2002 has been disclaimed.

[21] Appl. No.: 859,050

[22] Filed: May 2, 1986

[30] Foreign Application Priority Data

May 2, 1985 [DE] Fed. Rep. of Germany ... 8512865[U]

[51] Int. Cl.$^4$ ............................................. A44B 21/00
[52] U.S. Cl. ............................. 24/68 TT; 24/68 CT; 152/213 A; 152/219; 152/241; 152/242
[58] Field of Search ............... 152/208, 213 A, 213 R, 152/231, 214, 216, 217, 219, 220, 233–242; 81/15.8; 24/69 T, 69 TT, 70 CT, 70 TT, 599, 617, 68 CT, 68 TT

[56] References Cited

U.S. PATENT DOCUMENTS 4,542,779  9/1985  Müller et al. ............... 192/213 A Primary Examiner—Donald E. Czaja
Assistant Examiner—Thomas Bokan
Attorney, Agent, or Firm—Becker & Becker, Inc.

[57] ABSTRACT

A fastening member provided at the end of a spring-elastic mounting strap of a tire chain. The fastening member has an introduction passage and an attachment passage for a cooperating fastening member that is secured to the other end of the mounting strap. A guide passage interconnects the introduction passage and the attachment passage. This guide passage, at the level of a hook arm portion that partially separates the introduction passage from the attachment passage, extends at an angle of greater than 90° relative to the longitudinal axis of the attachment passage. In this way, the cooperating fastening member can be easily hooked in the fastening member. The inclined course of the guide passage relative to the longitudinal axis of the attachment passage assures a high degree of protection against accidental unhooking.

10 Claims, 2 Drawing Figures

4,719,669

FASTENING MEMBER FOR A TIRE CHAIN

BACKGROUND OF THE INVENTION

1. Field of the Invention

The present invention relates to a coupling link or fastening member for a mounting strap of a tire chain. The fastening member includes an introduction passage and an attachment passage for a counter or cooperating fastening member, with the introduction and attachment passages being interconnected by a guide passage, but otherwise being separated from one another by a hook arm portion that is provided with a securing element that narrows the attachment passage.

2. Description of the Prior Art

U.S. Pat. No. 4,542,779—Müller et al dated Sept. 24, 1985, which belongs to the assignee of the present application, discloses a fastening member of this general type. With this known fastening member, the securing element is formed by a rounded-off projection on the end of the hook arm. Between this arm end and the opposite wall, a guide portion of the guide passage is formed that extends at right angles to the introduction passage and to the attachment passage. Since this guide portion is perpendicular to the direction of insertion of a cooperating fastening member that is to be introduced into the fastening member, the cooperating fastening member, in order to be able to hook into the attachment passage, changes direction two times. A similar change in direction must also be carried out when the fastening members are disconnected. However, during use of the tire chain, the cooperating fastening member cannot accidentally carry out such movements. Furthermore, accidental unhooking of the cooperating fastening member is prevented by the projection, which the cooperating fastening member engages when it is pushed in the direction opposite to the hooking-in direction, and in the region of which the open width of the attachment passage is only slightly greater than the thickness of the cooperating fastening member.

An object of the present invention is to improve a fastening member of the aforementioned general type in such a way that a cooperating fastening member can be hooked easily into the attachment passage without getting hung up, yet is reliably protected against accidental unhooking.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The fastening member of the present invention is characterized primarily in that the guide passage, at the level of the hook arm portion, extends at an angle of at least greater than 90° relative to the longitudinal axis of the attachment passage.

The inclined course of the guide passage at the level of the hook arm portion assures that the cooperating fastening member can be inserted into the attachment passage in an effortless manner and without tilting or twisting. Since the mounting strap must be pressed together in order to close the fastening mechanism, which comprises the fastening member and the cooperating fastening member, the mounting strap is prestressed the greatest when the cooperating fastening member is in the inclined portion of the guide passage. When the mounting strap can relax somewhat again during the fastening process, and its ends spring apart, the cooperating fastening member, which is secured to one end of the mounting strap, is taken along. In so doing, the cooperating fastening member describes a path that corresponds approximately to the inclined course of the guide passage. As a result, the cooperating fastening member can be pushed in an effortless manner through the guide passage, so that there is no danger that it will get caught in or prior to the inclined region of the guide passage. Despite the simple manner for hooking the fastening member and the cooperating fastening member, the latter cannot become accidentally unhooked. To do so, it would have to change direction not only at the transition of the attachment passage to the guide passage, but also at the transition to the introduction passage. However, the cooperating fastening member does not carry out such complicated movements when the tire chain is mounted. The inclined portion of the guide passage provides additional protection against unhooking. Should the cooperating fastening member in fact reach the guide passage, the mounting strap would still have to be pressed together counter to its spring force in conformity with the incline of the guide passage. Since the mounting strap is furthermore fixed in position within the chain strap when the tire chain is placed in position, the mounting strap cannot be yieldingly pressed together to such an extent when the tire chain is mounted. Thus, the inclined region of the guide passage prevents, in a simple manner, the cooperating fastening member from accidentally becoming unhooked from the fastening member.

Further features of the present invention will be described in detail subsequently.

DESCRIPTION OF PREFERRED EMBODIMENTS

Figure 1:
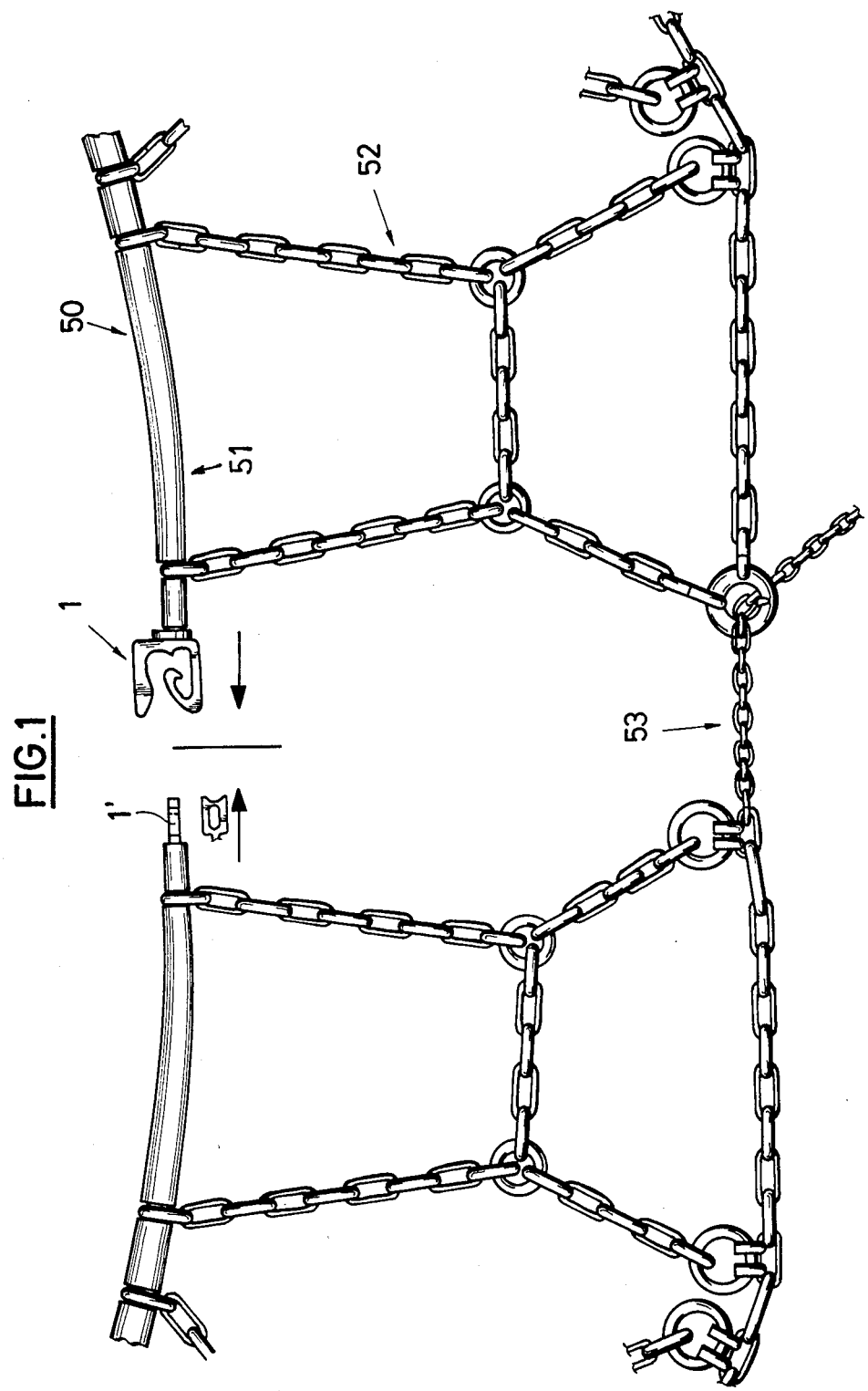
FIG. 1 is a view that shows a portion of a tire chain that is provided with one exemplary embodiment of the inventive fastening member.
Figure 2:
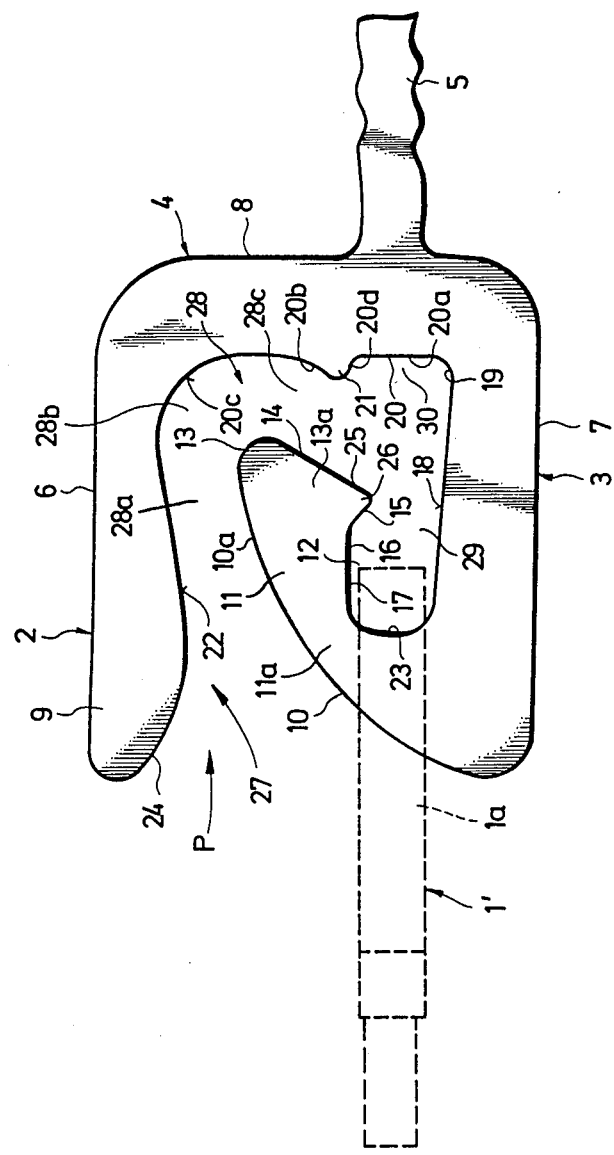
FIG. 2 is a side view of one embodiment of the inventive fastening member.

Referring now to the drawings in detail, the coupling link or fastening member 1 is provided on the end of a mounting strap 50 of an anti-skid tire chain. This chain has an inner part 51 that is connected with an outer part 53 by a portion 52 that is placed on the tread of a tire. The inner part 51 is formed by the spring-elastic mounting strap 50, which extends over nearly an angle of 360°. The fastening member 1 is provided at one end of the mounting strap 50, while the other end is provided with a ring-like counter or cooperating fastening member 1' (shown by dashed lines in FIG. 2). The fastening member 1 and cooperating fastening member 1' form a fastening mechanism, which must be opened when the chain is drawn onto the tire, and must be closed again after the chain has been placed on the tire.

To draw the tire chain onto the tire, the cooperating fastening member 1' is unhooked from the fastening member 1, and the outer part 53 is spread into a taut state. The spring-elastic mounting strap 50 is subsequently spread elastically, placed over the tire from the outer side of the tire, and is then pressed elastically together from the outer side of the tire, as a result of which the fastening member 1 and the cooperating fastening member 1' are moved toward one another. In so doing, the cooperating fastening member 1' becomes automatically hooked into the fastening member 1.

The fastening member 1 is embodied as a flat stamped metal part that has an approximately U-shape with parallel arms 2 and 3. These arms 2 and 3 are interconnected by a crosspiece 4 that extends at right angles to the arms. Provided on the backside of the crosspiece 4, i.e. on that side thereof remote from the cooperating fastening member 1', is a connection extension 5 to which can be secured an adapter (not illustrated) with which the fastening member 1 is secured to the free end of the mounting strap 50. The oppositely facing outer sides 6 and 7 of the arms 2 and 3, and the outer side 8 of the crosspiece 4, are planar and merge with one another via respective rounded portions. The free end 11 of the arm 3 extends inwardly at an angle toward the oppositely disposed arm 2. This inclined portion forms an angle of approximately 45° with the remainder of the arm.

The outer side 7 of the arm 3 merges in an arc-like curve with the outer side 10 of the free end 11. With a large radius of curvature, the outer side 10 is curved convexly outwardly. The free end 11 has an end 13 which, when viewed from the side, is curved approximately in the shaped of a semicircle. The end 13 connects the outer side 10 with an oppositely disposed end face 14 of the free end 11. The end face 14 extends at an acute angle of about 30° to the oppositely disposed end section 10a of the outer side 10. The end face 14 preferably merges at an angle of about 60° with a short linear end section 15 of the inner side 16 of the free end 11. Connected to the end section 15 is a section 17 of the inner side 16 that extends approximately parallel to the outer side 7 of the arm 3.

The inner side 16 is only about half as long as the outer side 10 of the free end 11, and merges in an arc-like curve with an inner wall section 23 that extends at approximately right angles to the inner side section 17. The inner wall section 23, in turn, merges in a rounded-off fashion with the inner side 18 of the arm 3; this inner side 18 extends approximately parallel to the outer side 7 of the arm 3. The end 11 has its least thickness in the vicinity of the rounded-off portion between the inner side 16 and the inner wall section 23. This reduced thickness is approximately only half as great as that thickness of the arm 3 between the outer side 7 and the inner side 18. From this weakened section 11a of the arm 3, the thickness of the end 11 increases in the direction toward the end 13 and toward the arm 3, so that the free end 11 has its greatest thickness in the region of the end face 14 and in the transition region to the arm 3.

The end section 15 and the adjacent section 25 of the end face 14 define a nose or projection 26 that is directed toward the arm 3 and extends into a hook-in or attachment passage 12 of the fastening member 1; this passage 12 is defined by the inner sides 17 and 18. The projection 26 extends beyond the inner side 16 to such an extent that it reduces the inside width of the attachment passage 12 by about one third. The section 25 forms one side of the projection 26, and is an extension of the end face 14 of the end 11.

The inner side 18 of the arm 3 is connected to the inner side 20 of the crosspiece 4 via a transition section 19 that is curved in an arc-like manner. The inner side 20 comprises several sections 20a to 20d. The first of these sections 20a extends parallel to the outer side 8 of the crosspiece 4, and is connected to the transition section 19. The section 20a merges into the second linear section 20b via a shoulder surface 20d that extends inwardly into a guide passage 28 of the fastening member 1. The section 20a, the shoulder surface 20d, and the inner side 18 define a recess 30 of the crosspiece 4. The section 20b is connected to the shoulder surface 20d at an acute angle of about 45°. The second section 20b, in conjunction with the shoulder surface 20d, defines a projection 21 that extends into the guide passage 28 beyond the inner side of the crosspiece 4. This projection 21 is disposed across from the end face 14 of the end 11. The section 20b preferably extends parallel to the end face 14 of the end 11 of the arm 3; in the illustrated embodiment, both the end face 14 and the section 20b extend linearly. Furthermore, both the section 20b and the end face 14 are disposed at an angle of approximately 120° relative to the longitudinal axis of the attachment passage 12. The section 20b merges into the curved third section 20c of the inner side 20, and is connected to the inner side 22 of the arm 2.

The inner side 22 of the arm 2 is arched outwardly in the direction toward the opposite arm 3 in such a way that the arm 2 has its greatest width approximately at the level of the inner wall section 23 between the inner sides 17 and 18. The thickness of the arm 2 decreases in the direction of the crosspiece 4 and in the direction of the rounded end 24. The end portion of the arm 2 that merges with the outer side 6 via the end 24 extends at an acute angle relative to the outer side 6.

The free end of the arm 3, and the opposite end 9 of the arm 2, define an introduction passage 27 for the cooperating fastening member 1', with the passage 27 tapering somewhat in the manner of an acute angle in the direction toward the crosspiece 4. The introduction passage 27 is defined by the outer side 10 of the end 11 of the arm 3, and by the inner side 22, or the end 24, of the end 9 of the arm 2. Since the introduction passage 27 is tapered in the direction of insertion P of the cooperating fastening member 1', the latter can be inserted very easily into the fastening member 1. In this connection, the surfaces 10 and 22, 24 serve as guide surfaces when the cooperating fastening member 1' engages them during insertion. The introduction passage 27 initially tapers to approximately the level of the greatest thickness of the arm 2, which is also the level of the inner wall section 23 of the arm 3. From here, the introduction passage 27 merges with a first guide section 28a of the guide passage 28. The guide section 28a has an approximately constant width, and extends to nearly the end or tip 13 of the free end 11 of the arm 3. In this guide section, the open width of the guide passage is only slightly greater than the thickness of the cooperating fastening member 1'. The guide section 28a then merges into a second guide section 28b that is defined by the inner wall section 20c of the crosspiece 4, the end 13, and the end face 14 of the end 11. The guide section 28b is curved in the manner of a partial circle, and then merges into a linear guide section 28c that extends at an angle of approximately 45° relative to the first guide section 28a. The open width of the guide sections 28b and 28c is similarly essentially constant and only slightly greater than the thickness of the cooperating fastening member 1'. The guide sections 28a to 28c connect the introduction passage 27 with the attachment passage 12, which is defined by the arm 3 and the free end 11. When the mounting strap 50 is closed, the cooperating fastening member 1' is located in the attachment passage 12. The free end 11 serves as an attachment hook for the cooperating fastening member 1', which is embodied in a ring-like fashion; the free end 11 extends through the ring opening 1a of the cooperating fastening member 1'. Since the free end 11 extends at an angle, it provides additional protection against an accidental unhooking of the cooperating fastening member 1'. As a consequence of the described configuration, the guide passage 28 is disposed, at the level of the free end 11, at an angle of at least greater than 90° relative to the longitudinal axis of the attachment passage 12. Furthermore, the guide passage 28 is disposed at an acute angle to the introduction passage 27.

When the fastening member 1 and the cooperating fastening member 1' are connected, the latter first passes into the introduction passage 27. As the cooperating fastening member 1' is pushed in further, it passes into the first guide section 28a, whereupon it is guided along the inner side 20 of the crosspiece 4 in the direction toward the attachment passage 12. Since the open width of the attachment passage 12 is greater in the region adjacent to the second guide section 28b than in the guide passage itself, the cooperating fastening member 1' can be moved easily into the attachment passage 12. To close the fastening mechanism, the direction of movement of the cooperating fastening member 1' is changed at least twice until it reaches the attachment passage 12. When the cooperating fastening member 1' is to be unhooked from the fastening member 1, it is necessary to carry out these movements of the cooperating fastening member 1' in the opposite direction. However, during use of the anti-skid tire chain, these movements of the cooperating fastening member 1' cannot be carried out since the inner part 51 of the tire chain is tensioned, so that the cooperating fastening member 1' is pulled against the inner wall section 23 of the arm 3 of the fastening member 1. This results in a high degree of reliability against accidental loosening of the fastening members. Since the nose or projection 26 narrows the attachment passage 12, there is provided at this location a passage area 29 having a width that is only slightly greater than the thickness of the cooperating fastening member 1'. As a result, the cooperating fastening member 1' can be pushed through the passage area 29 only when it is aligned precisely relative to the fastening member 1. If the cooperating fastening member 1' is at an angle to the fastening member 1, it cannot be pushed or moved through the passage area 29, which is delimited on one side by the securing element, i.e. the projection 26. Thus, the securing element 26, in combination with the various directions of movement of the cooperating fastening member 1', assure that the fastening members can only be separated from one another when such an action is intended by the user of the antiskid tire chain.

The recess 30 serves as additional protection against unhooking, and is disposed in the extension of the attachment passage 12. Should the cooperating fastening member 1' accidentally pass over the projection 26 and out of the attachment passage 12, it is guided into the recess 30, which prevents a change in the direction of movement of the cooperating fastening member 1'. In this connection, the projection 21, just like the projection 26, serves as a securing element that prevents an unobstructed passage of the cooperating fastening member 1' into the guide passage 28, or at least makes it very difficult for the cooperating fastening member 1' to do so.

The present invention is, of course, in no way restricted to the specific disclosure of the specification and drawings, but also encompasses any modifications within the scope of the appended claims.

What we claim is:

1. A fastening member for a mounting strap of a tire chain, said fastening member including an introduction passage and an attachment passage for a cooperating fastening member, with said introduction passage and said attachment passage being interconnected by a guide passage, but otherwise being separated from one another by a hook arm portion that is provided with a securing element that narrows said attachment passage; the improvement comprised therein that:

said guide passage, at the level of said hook arm portion, extends at an angle of greater than 90° relative to the longitudinal axis of said attachment passage.

2. A fastening member according to claim 1, in which said guide passage extends at an acute angle relative to said introduction passage.

3. A fastening member according to claim 1, which includes a first arm, a second arm on which said hook arm portion is provided, and a crosspiece that interconnects said first and second arms; in which said hook arm portion has a linearly extending end face that faces said crosspiece; and in which said crosspiece has an inner side that faces said hook arm portion, with said guide passage, at the level of said hook arm portion, being defined by said end face of the latter, and by a linear portion of said inner side of said crosspiece disposed across from said end face.

4. A fastening member according to claim 3, in which said linear end face of said hook arm portion, and said oppositely disposed linear portion of said inner side of said crosspiece, extend parallel to one another.

5. A fastening member according to claim 4, in which said end face of said hook arm portion, and said oppositely disposed portion of said inner side of said crosspiece, extend at an angle of approximately 120° to the longitudinal axis of said attachment passage.

6. A fastening member according to claim 3, in which said securing element of said hook arm portion is a triangular projection, one face of which is disposed in the extension of said end face of said hook arm portion.

7. A fastening member according to claim 3, in which said crosspiece is provided with a projection that extends beyond said inner side of said crosspiece toward said hook arm portion, with said end face of said hook arm portion being disposed across from said projection.

8. A fastening member according to claim 7, in which said projection of said crosspiece has a face that is formed by that portion of said inner side of said crosspiece that is disposed across from said end face of said hook arm portion.

9. A fastening member according to claim 7, in which said crosspiece is provided with a recess at the level of said attachment passage, with said recess having one end delimited by said projection.

10. A fastening member for a mounting strap of a tire chain, said fastening member having an approximately U-shaped configuration, with said fastening member comprising:
 a first arm;
 a second arm that is substantially parallel to said first arm;
 a crosspiece that interconnects said first and second arms, with that end of said second arm that is remote from said crosspiece being provided with a hook member that extends back into the space defined by said crosspiece and said first and second arms in such a way that an introduction passage, which extends in a first direction, is formed between said first arm and a portion of said hook member, an attachment passage, which extends in a second direction, is formed between said second arm and another portion of said hook member, and a guide passage, which interconnects said introduction passage and said attachment passage, is formed between said crosspiece and yet another portion of said hook member, with said introduction passage, said guide passage, and said attachment passage serving to receive a cooperating fastening member, and with at least a portion of said guide passage extending at an obtuse angle relative to said second direction of said attachment passage and at an acute angle relative to said first direction of said introduction passage; and a securing element disposed on said hook member and extending into said attachment passage to narrow the latter.

* * * * *